United States Patent [19]

Christie

[11] 4,434,652

[45] Mar. 6, 1984

[54] AUTOMATED TIRE MEASUREMENT TECHNIQUES

[75] Inventor: William C. Christie, Tallmadge, Ohio

[73] Assignee: The Goodyear Tire & Rubber Company, Akron, Ohio

[21] Appl. No.: 339,876

[22] Filed: Jan. 18, 1982

[51] Int. Cl.³ .............................................. B60C 19/10
[52] U.S. Cl. .................................................... 73/146
[58] Field of Search .................. 73/146; 364/507, 560; 33/174 PC

[56] References Cited

U.S. PATENT DOCUMENTS

| 2,251,803 | 8/1941 | Pummill | 73/51 |
| 3,303,571 | 2/1967 | Veals | 33/174 |
| 3,595,068 | 7/1971 | Skidmore | 73/66 |
| 3,719,813 | 3/1973 | Friedman et al. | 235/151.31 |
| 3,725,163 | 4/1973 | Hofelt | 156/64 |
| 3,740,710 | 6/1973 | Weintraub et al. | 340/52 |
| 3,895,518 | 7/1975 | Leblond | 73/146 |
| 3,911,739 | 10/1975 | Murata et al. | 73/146 |
| 3,918,816 | 11/1975 | Foster et al. | 356/167 |
| 4,004,693 | 1/1977 | Tsuji et al. | 209/81 |
| 4,018,087 | 4/1977 | Wenz | 73/146 |
| 4,241,300 | 12/1980 | Hayes et al. | 318/590 |
| 4,258,567 | 3/1981 | Fisher | 73/146 |
| 4,285,240 | 8/1981 | Gold | 73/462 |
| 4,311,044 | 1/1982 | Marshall et al. | 73/146 |
| 4,327,580 | 5/1982 | Suzuki et al. | 73/146 |

FOREIGN PATENT DOCUMENTS

| 2907906 | 9/1979 | Fed. Rep. of Germany . |
| 2913280 | 7/1981 | Fed. Rep. of Germany . |
| 2072346 | 9/1981 | United Kingdom . |

Primary Examiner—Jerry W. Myracle
Attorney, Agent, or Firm—T. P. Lewandowski; R. L. Larson

[57] ABSTRACT

An improvement in a tire manufacturing system including apparatus for testing by different combinations of testing algorithms and tire sensors. An operator selects the combinations best suited to test the tire according to the user's specifications. The tire is rotated and measured for lateral runout of both sidewalls. The resulting data is converted to digital form and analyzed according to the selected combinations of sensors and testing algorithms.

14 Claims, 12 Drawing Figures

$ISTART_1 = 1 \quad IVAL(ICNTR)_1 = 8 \quad IFINI_1 = 31$
$ISTART_2 = 2 \quad IVAL(ICNTR)_2 = 12 \quad IFINI_2 = 32$
$IWSUM_1 = 140$
$IWSUM_2 = 140$
$NEWVAL_1 = \quad\quad\quad 8 \times 31 - 140 = 108$
$NEWVAL_2 = \quad\quad\quad 12 \times 31 - 140 = 232$
$VALUE_1 = 28$
$VALUE_2 = 7.48$

Fig. 9

AUTOMATED TIRE MEASUREMENT TECHNIQUES

BACKGROUND AND SUMMARY

This invention relates to the manufacture of vehicle tires and more particularly relates to the portion of the manufacturing process which subjects the tire to a plurality of quality control tests.

The tire industry has long sought an automated method of improving the quality of tires. Over the years, a variety of tests have been devised for evaluating different parts and different characteristics of tires. In a typical test, a tracking probe picks up data from a designated portion of a rotating tire, and mechanical or electrical apparatus analyzes the data according to a predetermined testing algorithm. The tracking probes may be arranged to obtain data from a variety of different tire surfaces. For example, U.S. Pat. No. 3,303,571 (Veals—Feb. 14, 1967) describes probes arranged to track at several different locations along the sidewall and tread of the tire. Multiple tracking probes are also shown in U.S. Pat. Nos. 2,251,803 (Pummill—Aug. 5, 1941) and U.S. Pat. No. 3,895,518 (Leblond—July 22, 1975).

In recent years, automobile manufacturers have placed increasingly stringent tolerances on tire dimensions and performance characteristics. Meeting all the tolerances normally requires multiple tracking probes and multiple testing algorithms. In order to maintain normal production rates, the multiple tracking and testing algorithms must be completed as rapidly as possible, usually on a single machine in no more than one or two revolutions of the tire. These requirements limit the number of tests which can be performed by existing machines. Unfortunately, the number of tests required has drastically increased, and different tire users typically have different tolerances or performance requirements which necessitate different tests.

Prior art testing machines have been unable to cope with the proliferation of testing requirements. Such testing machines have one or more tracking probes which are dedicated to a specific testing algorithm. There is no convenient and reliable way to mix and match a tracking probe with more than one testing algorithm or vice versa. As a result, it is difficult, if not impossible, for prior art testing machines to readily adapt or modify the tests performed by the machine to accommodate different tolerances or performance requirements of different tire users. Rapid adaptation is essential in order to keep up with production line testing rates.

Accordingly, it is a primay object of the present invention to improve the manufacture of tires by furnishing an automated digital technique for accurately and rapidly matching a predetermined tire tracking probe with a predetermined tire testing algorithm.

Another object is to provide a technique of the foregoing type capable of use by production line personnel.

Still another object is to provide a technique of the foregoing type in which test algorithms or tracking probes can be rapidly and accurately changed to accommodate different tire specifications.

Yet another object is to provide a technique of the foregoing type in which new tracking probes or testing algorithms can be rapidly added without altering existing tracking probes or testing algorithms.

In order to achieve these objectives, the applicant has totally departed from prior art machines which tie a tracking probe to a specified testing algorithm. The applicant has discovered that by using proper digital techniques, including a memory and processor, tracking probes and testing algorithms can be mixed and matched in a rapid and reliable manner according to the test criteria needed to properly evaluate different kinds of tires. Production line personnel can conveniently make the requisite modifications in order to keep up with production line rates of testing. By these techniques, the condition of a tire can be rapidly tested and with a degree of accuracy and reliability previously unobtainable.

DESCRIPTION OF THE DRAWINGS

These and other objects, advantages and features of the invention will appear for purposes of illustration, but not limitation, in connection with the accompanying drawings wherein like numbers refer to like parts throughout and wherein.

DESCRIPTION OF THE PREFERRED EMBODIMENT

Figure 1:
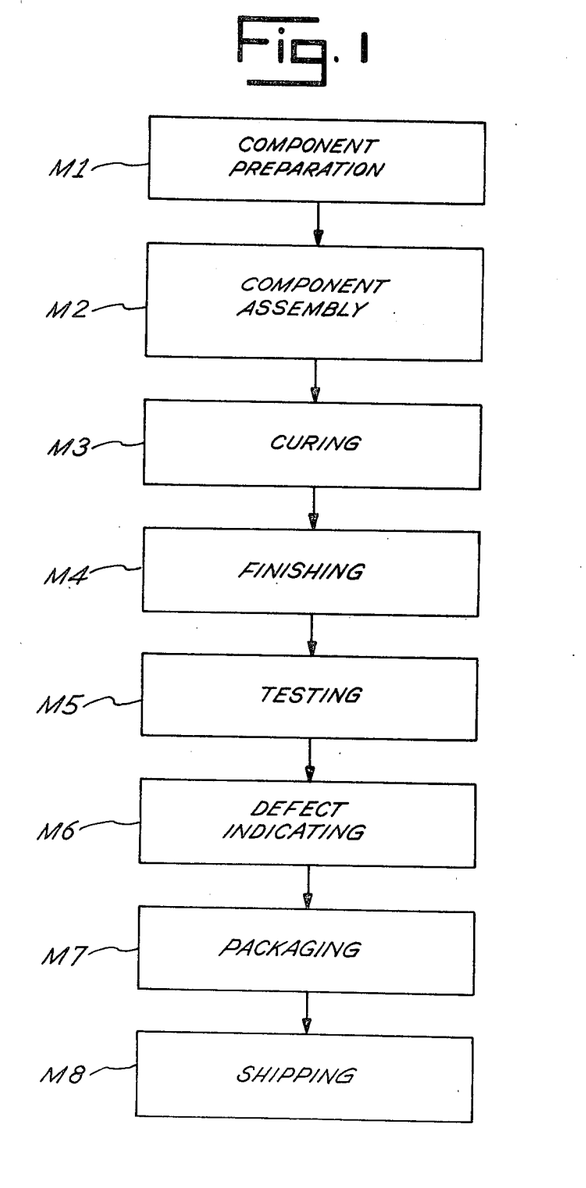
FIG. 1 is a schematic flow diagram of an exemplary method of manufacturing a vehicle tire.

Referring to FIG. 1, eight basic steps of manufacturing a vehicle tire are shown in blocks M1-M8. In step M1, rubber compounds are mixed and some tire fabric is coated with the compounds. In addition, various component parts of the tire, such as tread and belts, are fabricated and cut to approximate size. In step M2, the prepared components are assembled together on a mandrel. In step M3, the assembled components are cured, thereby solidifying the component parts into a unified whole. In step M4, raw edges created during the curing process are cut or ground and, in some cases, letters and other indicia are cut into the sidewall of the tire. In step M5, the tire is tested for defects, an important part of the overall manufacturing process. In step M6, tires with defects, if any, are indicated. Two methods of indication are: (1) marking the defective tire with an appropriate indicia, or (2) segregating defective tires from good tires. In step M7, the tires are packaged in preparation for shipment to a customer (step M8).

Figure 2:
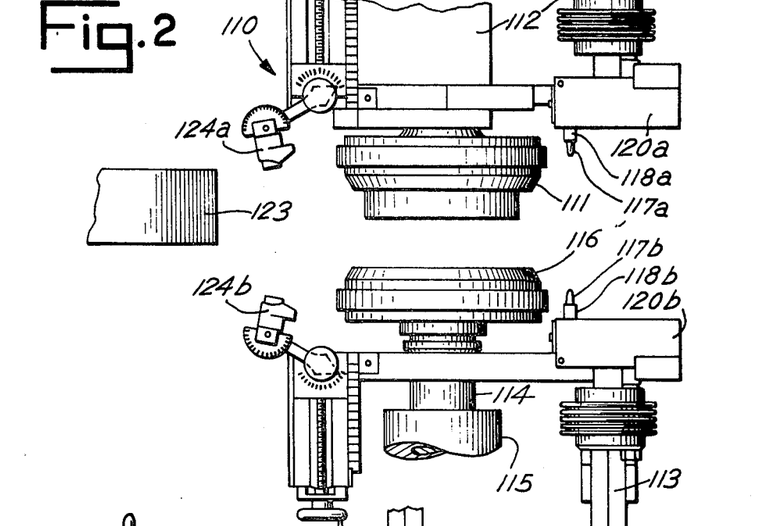
FIG. 2 is a fragmentary, side elevational view of a conventional tire force variation measuring and grinding machine adapted to provide certain input measurement signals required by the preferred embodiment of the invention.
Figure 3:
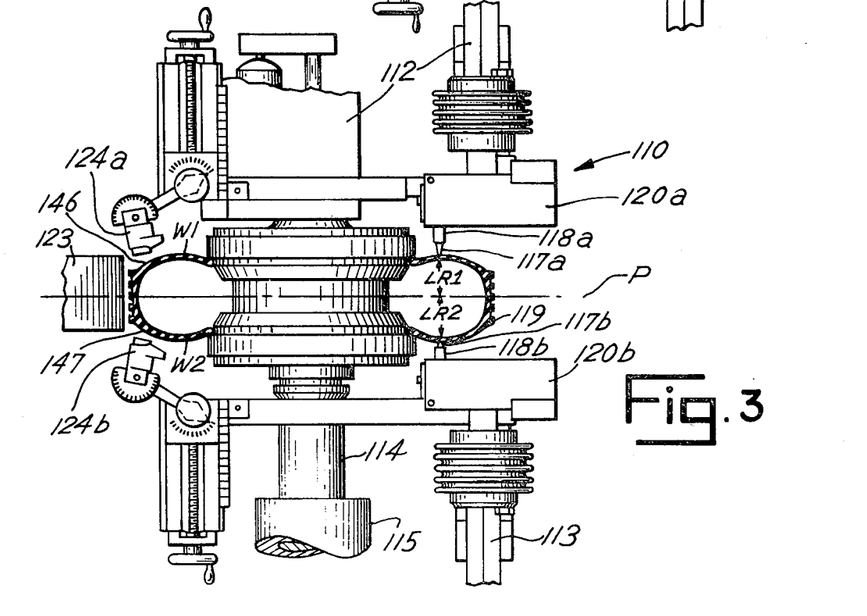
FIG. 3 is another view of the apparatus shown in FIG. 2 in which a tire is mounted and inflated, and tracking probes are positioned to provide the input measurement signals.

Referring to FIGS. 2 and 3, a portion of testing step M5 may be carried out by a tire force variation measuring and grinding machine suitably adapted for tracking probes which measure the lateral runout on each of the two sidewalls of a cured tire. Such machines are well known in the art, and need not be described in detail. One such machine is shown in U.S. Application Ser. No. 188,707, entitled "Tire Dynamic Imbalance Screening System," filed Sept. 19, 1980 now U.S. Pat. No. 4,414,843 in the names of Kounkel et al., and assigned to the same assignee as the present application. As described in more detail in that application, a force variation testing machine 110 has an upper chuck 111 rotatably mounted on an upper frame 112. A lower frame 113 supports a vertical spindle 114 for rotation and vertical movement in a sleeve 115 attached to the frame. A lower chuck 116 is mounted on spindle 114 and is axially movable from an open retracted position shown in FIG. 2 to a closed extended position shown in FIG. 3.

Tracking probes 118a and 118b capable of generating an analog signal proportional to the lateral runout of the tire sidewalls preferably include a tip 117a and a tip 117b. The probes are connected to linear displacement transducers mounted on upper frame 112 and lower frame 113 for engagement with a tire 119 mounted between chucks 111 and 116 as shown in FIG. 3. Probes 118a and 118b are carried by measuring mechanism supports 120a and 120b, respectively, which are vertically adjustable relative to upper frame 112 and lower frame 113 to provide clearance for movement of tire 119 between upper chuck 111 and lower chuck 116. The vertical adjustment may be provided by air-actuated piston and cylinder apparatus mounted on frames 112 and 113 which carry the measuring mechanism supports 120a and 120b from retracted positions shown in FIG. 2 to extended positions, shown in FIG. 3, with tips 117a and 117b in contact with tire 119.

Tire inflating apparatus, such as a port (not shown) in one of chucks 111 or 116 is also provided for communication between the space enclosed by tire 119 and a source of air pressure. A load roller 123 is movable radially of tire 119 into engagement with the tread of the tire and may be used to seat the tire on the bead seats of upper chuck 111 and lower chuck 116.

As an alternative to tips 117a and 117b, proximity sensors 124a and 124b may be carried on the measuring mechanism supports 120a and 120b for vertical adjustment into positions spaced from the tire. Sensors 124a and 124b provide signals indicating lateral runout as tire 119 is rotated on chucks 111 and 116.

Figure 5:
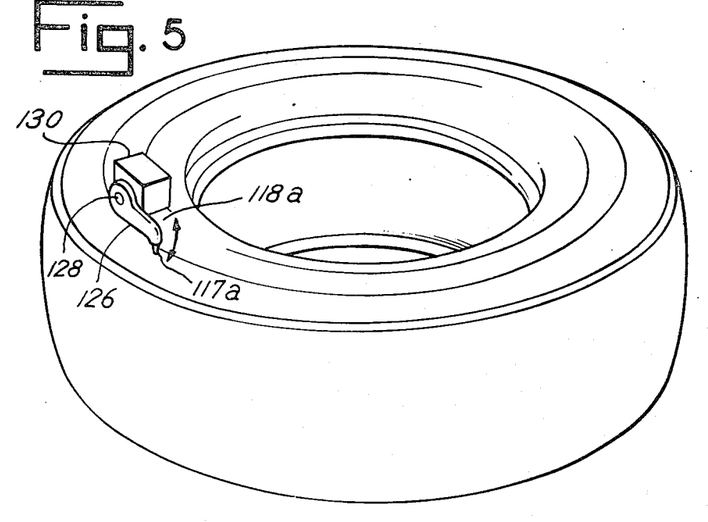
FIG. 5 is a schematic view of the tire shown in FIG. 4 illustrating the placement of a tracking probe on the sidewall of the tire.
Figure 6:
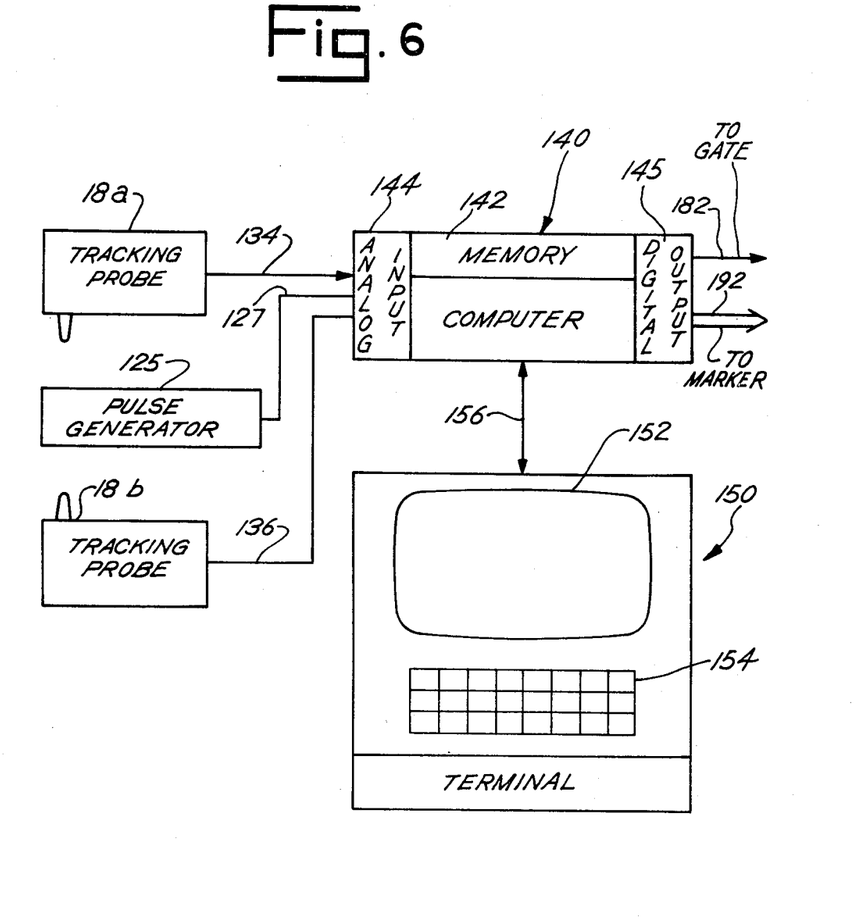
FIG. 6 is an electrical schematic block diagram illustrating a preferred form of processing and memory apparatus for use in connection with the preferred embodiment as connected to the tracking probes.

Referring to FIG. 5, probe 118a is shown in more detail. Probe 118b is identical to probe 118a and may be understood with reference to FIG. 5. Probe 118a comprises an aluminum arm 126 bearing a carbide tip 117a. The arm rotates with an axle or pin 128 and is biased by a spring (not shown) which urges the arm toward the tire sidewall. The arm is made as light as possible and the spring force is the minimum needed to cause the tip to follow the undulations in the sidewall of the tire. Rotation of arm 126 caused by contact with tire 119 causes pin 128 to rotate inside a resolver 130. The resolver acts as a transducer which converts the movement of the probe against the sidewall of the rotating tire into a corresponding analog signal on output conductor 134 (FIG. 6). The signal has a value proportional to the lateral runout of the tire sidewall. A similar signal for the opposite sidewall is produced on a conductor 136 connected to the transducer associated with probe 118b (FIG. 6). Additional details of resolver 130 are described in U.S. application Ser. No. 270,087 entitled "Method and Apparatus For Tire Sidewall Bulge And Valley Detection," filed June 3, 1981 now U.S. Pat. No. 4,402,218 in the name of Jean Engel and assigned to the same assignee as the present application.

Figure 4:
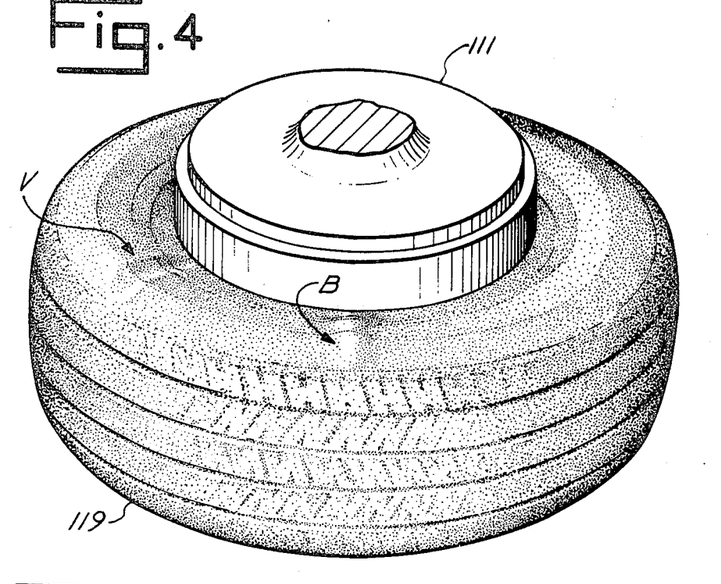
FIG. 4 is an enlarged perspective view of the tire mounted and inflated.

Tire 119 is typically carried to machine 110 by an automatic conveyor and is automatically positioned upon lower chuck 116, inflated, and caused to rotate by contact with rotating roller 123. A pulse generator 125 (FIG. 6) attached to spindle 114 generates an electrical pulse each time the tire rotates through one degree of arc (360 pulses per revolution) and transmits the pulse over a conductor 127. Probes 118a and 118b are then brought into contacting engagement with opposite sidewalls W1 and W2 of the tire. As shown in FIG. 5, the probes track a relatively thin section of the sidewalls about a circumference which is unobstructed by lettering or other molded depressions or protrusions such that the movement of the probes are characteristic of deflections of the sidwalls themselves. As tire 119 is rotated, probes 118a and 118b ride on the sidewalls of the tire, and the transducers associated with the probes produce analog signals having values proportional to the lateral runout of the sidewalls. Thus, the probes are able to detect a bulge B or a valley V (FIG. 4).

In the event there are undesired deformations in sidewall W1, dimension LR1 extending from plane P to the outside of the sidewall will experience fluctuations (FIG. 3). Likewise, if there are undesired deformations in sidewall W2, the lateral runout dimension LR2 between plane P and the outside of sidewall W2 will fluctuate. As shown in FIG. 3, plane P is perpendicular to the axis of rotation of the tire and passes through the center of the tire thereby dividing the tire into two equal sections with bilateral symmetry.

Referring to FIG. 6, tracking probes 118a and 118b are connected to a computer or processing device 140. Preferably the computer comprises a model HP 1,000 L-series manufactured by Hewlett-Packard Corporation. This computer has a random access memory 142, an analog input card 144 which contains an analog-to-digital converter, and a digital output card 145 which provides signals to gating and marking devices shown in FIG. 9. As shown in FIG. 6, the tracking probes are connected through conductors 134 and 136 to the analog input card of the computer. The computer also contains a terminal 150 which is preferably a model HP 2645a also manufactured by Hewlett-Packard Corporation. The terminal contains a CRT display 152 and a keyboard 154. The terminal is connected to computer 140 through a conventional buss 156 supplied by Hewlett-Packard.

Figure 9:
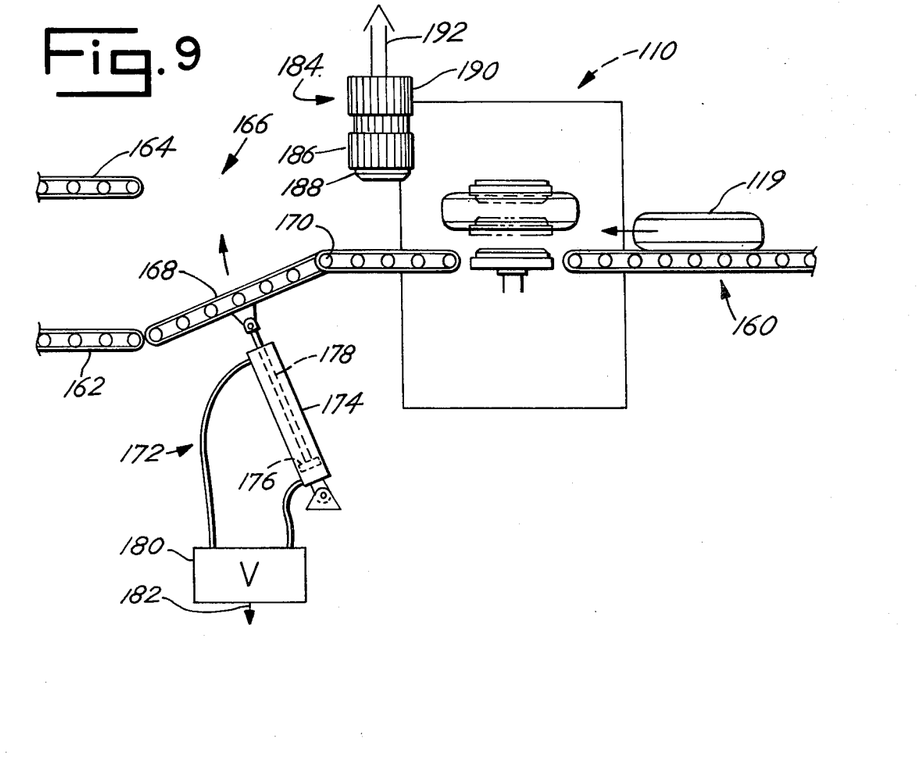
FIG. 9 is a schematic side elevation of a preferred form of tire marking and gating apparatus for use in connection with the preferred embodiment.

Referring to FIG. 9, tire 110 is carried to testing machine 110 by a conventional conveyor 160. If the tire is defective, it is conveyed to a conveyor 162; if the tire is acceptable, it is conveyed to a conveyor 164. Proper conveying of the tire is achieved through a gating mechanism 166 comprising a conveyor 168 which is rotated around an axis 170 by a pneumatic controller 172. Controller 172 includes a cylinder 174 fitted with a piston 176 which raises or lowers a connecting rod 178. Compressed air is admitted to the upper or lower sides of the piston by a valve 180 controlled by a logical gating signal transmitted over a conductor 182.

The tire can be marked with ink by means of a marking mechanism 184 comprising 8 stamping plates 186 which are primed by an ink supply 188. Eight solenoids 190 (one for each plate) are capable of depressing individual plates into contact with the tire. By energizing combinations of solenoids, $2^8$ different patterns of marks can be placed on the tire. The solenoids are controlled by an 8-bit buss 192 connected to computer 140 (FIG. 6).

Referring to FIG. 6, the operator places data into computer 140 through a keyboard utility routine which requests information on CRT display 152 and enables the information to be entered through keyboard 154. The keyboard utility (KBU) facility is activated by depressing the space bar on keyboard 154 and then entering the code "RU, KBU (RETURN)." The primary menu shown in the following Table 1 will then be listed on display 152:

TABLE 1

| KBU: | KBU DISPLAY FUNCTION | VALUE |
|---|---|---|
| 0 | EXIT KBU | |
| 1 | Bulge Window | 31 |
| 2 | Measure Specs | |
| 3 | Limit Tables | |

KBU: ENTER FUNCTION

Figure 7A:
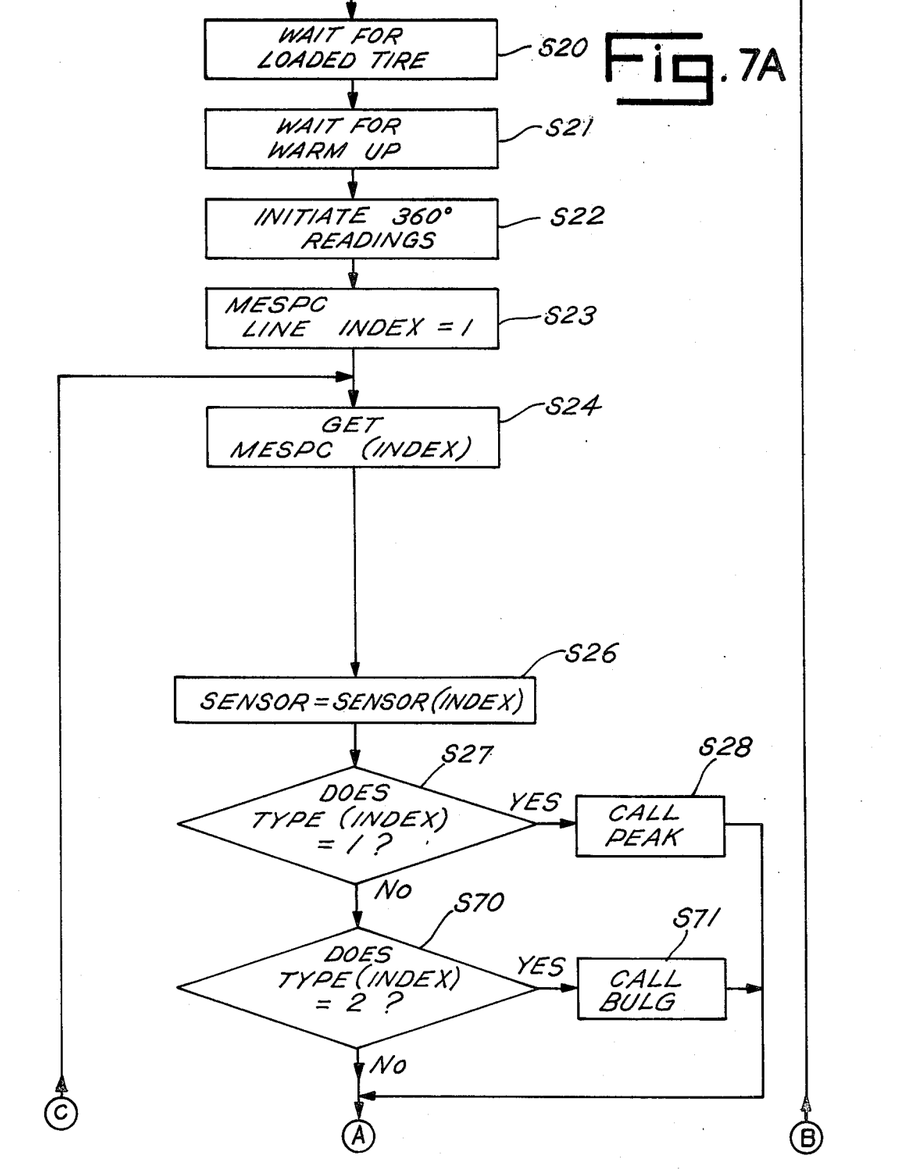
FIGS. 7A, 7B, 7C, and 7D are flow diagrams illustrating a preferred form of program for the processing apparatus shown in FIG. 6.
Figure 7B:
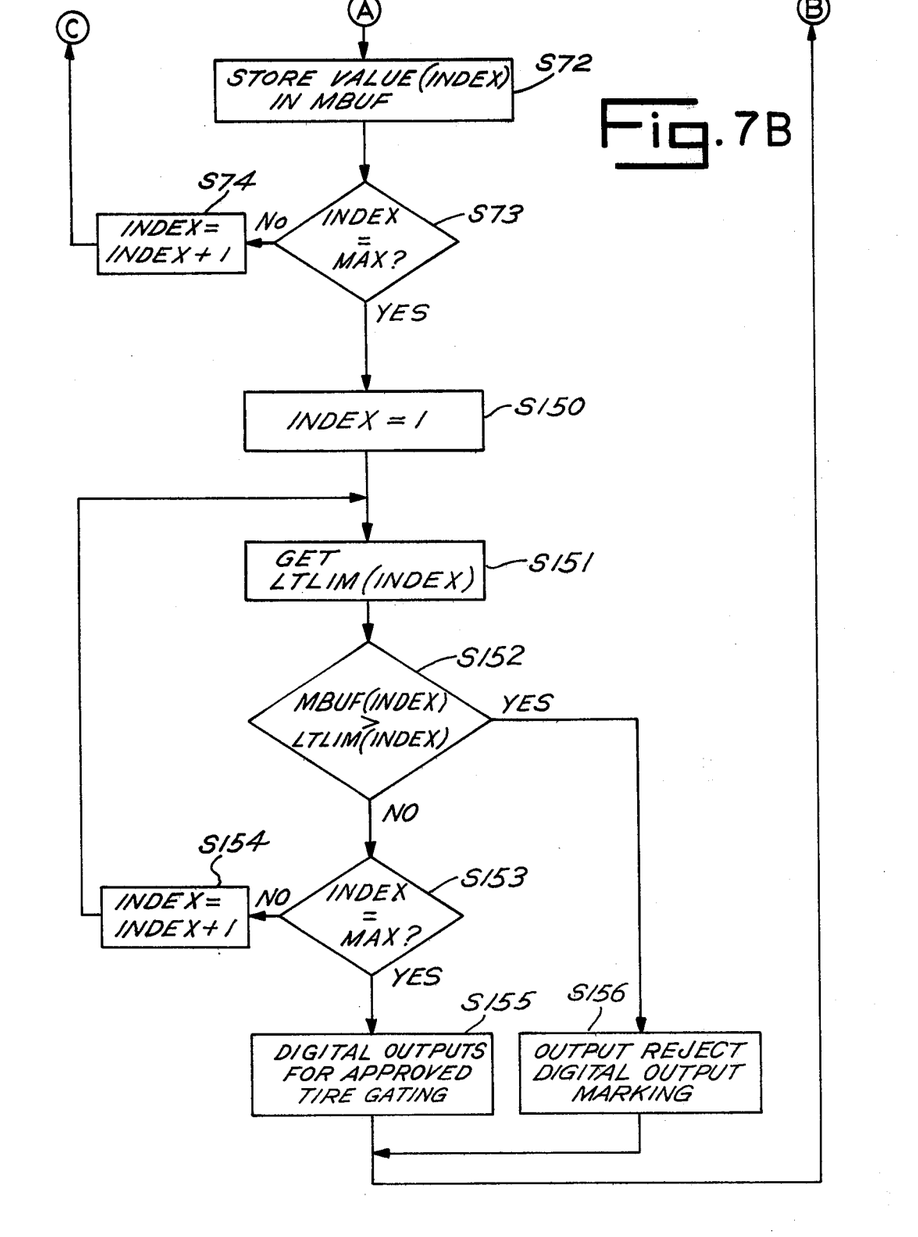
Figure 7C:
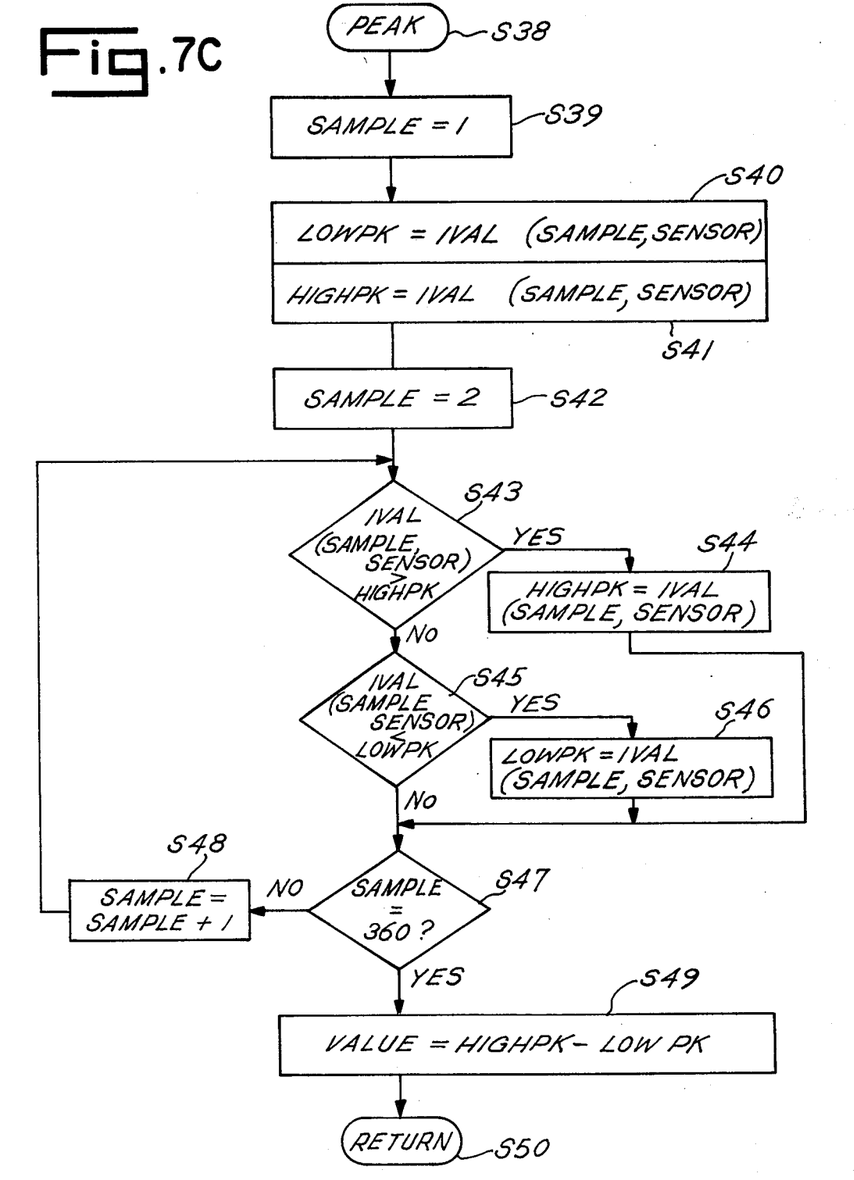
Figure 7D:
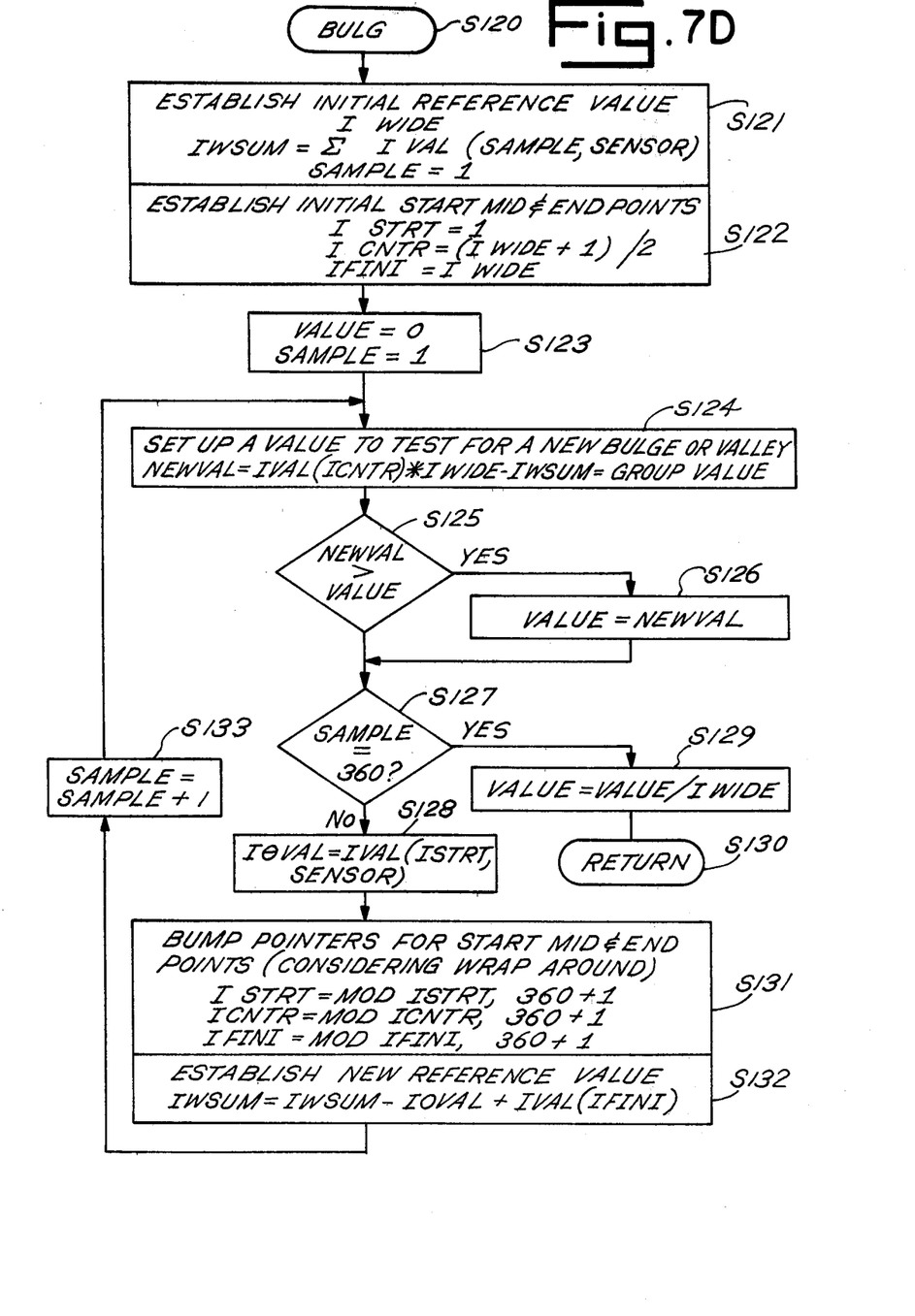

Line 1 of the KBU display defines the size of one of the parameters used in the algorithm shown in FIG. 7D. This parameter will be explained later in connection with FIG. 7D. Line 2 of the KBU display enables the operator to determine the type of measurement specifications to be measured, and line 3 of the KBU display enables the operator to place measurement limits on those specifications. It is important that the last function entered is a zero (0) so that another activity of the apparatus can be entered.

Assuming the operator wants to define the measurement specifications, he enters 2 on the keyboard. The apparatus then automatically displays instructions for selecting the measurement specifications as shown in Table 2.

TABLE 2

| MEASUREMENT SPECIFICATION DISPLAY | | | |
|---|---|---|---|
| Line | Label | Type | Sensor |
| 1 | PTP1 | 1 | 1 |
| 2 | PTP2 | 1 | 2 |
| 3 | BLG1 | 2 | 1 |
| ENTER LINE NUMBER 1 | | | |
| ENTER 4 CHAR. LABEL PTP1 | | | |
| ENTER MEASUREMENT TYPE 1 | | | |
| ENTER SENSOR NUMBER (S) 1 | | | |

A variable MAX indicating the maximum number of allowable lines in Table 2 is established by the programmer. The value for MAX is stored in a common data storage table which is accessed by the program. The type numbers displayed in Table 2 identify types of analysis which can be carried out by the program. In the preferred embodiment, the program can carry out either a peak-to-peak analysis or a so-called bulge analysis. The programmer has assigned type number 1 to the peak-to-peak analysis and type number 2 to the bulge analysis.

The sensor numbers displayed in Table 2 identify the sensors shown in FIG. 3. The sensor number is assigned by determining the channel of analog input 144 into which the tracking probes are connected. In the preferred embodiment, sensor 118a is assigned number 1 and sensor 118b is assigned number 2.

As shown in Table 2, the operator can define the measurement functions of the apparatus without any reprogramming. Table 2 provides the ability to mix and match types of test algorithms or data analysis with different sensors. For example, the operator can choose a peak-to-peak analysis in connection with the data obtained from sensor 118a or sensor 118b. Likewise, the operator can choose a bulge analysis from sensor 118a or 118b. For each combination of analysis and sensor, the operator enters the data called for at the bottom of the Table 2 display. For example, assuming the operator wants a peak-to-peak analysis from sensor 118a, he would enter line number 1, and then type an arbitrary 4 character label (e.g., PTP1). He would then enter the type code for peak-to-peak analysis (i.e., 1) and the number of the sensor desired (i.e., 1 for 118a). The operator would then enter similar information for all of the other combinations of analysis type and sensor desired in connection with any particular tire. Each new type of analysis would require another line number.

Assuming the operator had selected a peak-to-peak analysis for sensor 118a, in connection with line 1, the values underlined in Table 2 would be displayed. If the operator then requested another peak-to-peak analysis for sensor 118b, and a bulge analysis for sensor 118a, display 152 would display values for these requests in a similar manner.

The information entered by the operator would not only be displayed on display 152, but also would be stored in memory 140 in a measurement table MESPC.

After the operator confirms that he has entered the proper measurement specifications, he returns to the KBU display and then proceeds to the limit tables by entering the number 3 on the keyboard. Display 152 then lists the limit table as shown in Table 3 minus the underlined values:

TABLE 3

| LIMIT TABLE DISPLAY | | |
|---|---|---|
| Line | Measurement | Limit |
| 1 | PTP1 | 35 |
| 2 | PTP2 | 35 |
| 3 | BLG1 | 20 |
| Marking Bits | | |
| 4 | 0000 0000 | |
| Enter Line Number | 1 | |
| Enter Value | 35 | |

In response to the display shown in Table 3, the operator can enter limits for each of the selected analyses beyond which the tire will be judged defective, and can enter the value of an 8 bit marking code in line 4.

Assuming that the operator enters a limit of 35 for the peak-to-peak analysis (i.e., PTP1) in line 1, display 152 will list this limit as shown in the underlined portions of Table 3. Values for lines 2-4 will be displayed in a similar manner.

The values entered in Table 3 will not only be displayed but also stored in memory 140 for use by the analysis procedures shown in FIGS. 7C and 7D.

After the limits have been entered, and the operator exists the KBU function by entering "0", the apparatus is enabled to analyze tire 119.

Referring to FIG. 7A, the program enters step S20 in which the apparatus waits for a loaded tire. As shown in FIG. 9, a tire, such as tire 119, is carried to the apparatus along a conveyor 160. As shown in FIGS. 2 and 3, the tire is automatically fitted onto chucks 111 and 116. The chucks are then driven to the closed position shown in FIG. 3. A load roller 123 is then rotated and driven into contact with the tread of tire 119 so that the tire is properly aligned with the chucks and is inflated. As soon as tire 119 starts rotating on the chucks, pulses are sent to computer 140 from a pulse generator 125 (FIG. 6). When the pulses are sent, the program enters step S21 (FIG. 7A) and waits until a pedetermined time has passed, after which the program assumes that the tire is rotating at the proper speed.

In step S22, the computer samples and stores in digital form 360 values from sidewall W1 and 360 values from sidewall W2 (FIG. 3). One value for each of sidewall W1 and W2 is stored for each degree of rotation of tire 119. Thus, 360 values correspond to the entire 360 degree arc of sidewall W1, and a like number of values correspond to the entire 360 degree arc of sidewall W2. The values for each degree of tire rotation are stored in a memory array IVAL in the form shown in Table 4:

TABLE 4

STORED TIRE DATA (DBUF)

| SAMPLE | SENSOR | IVAL |
|---|---|---|
| 1 | 1 | 0 |
| 2 | 1 | 0 |
| 3 | 1 | 0 |
| 4 | 1 | 0 |
| 5 | 1 | 0 |
| 6 | 1 | 0 |
| 7 | 1 | 0 |
| 8 | 1 | 0 |
| 9 | 1 | 0 |
| 10 | 1 | 0 |
| 11 | 1 | 0 |
| 12 | 1 | 0 |
| 13 | 1 | 0 |
| 14 | 1 | 0 |
| 15 | 1 | 0 |
| 16 | 1 | +8 |
| 17 | 1 | +12 |
| 18 | 1 | +16 |
| 19 | 1 | +20 |
| 20 | 1 | +20 |
| 21 | 1 | +20 |
| 22 | 1 | +16 |
| 23 | 1 | +12 |
| 24 | 1 | +8 |
| 25 | 1 | +4 |
| 26 | 1 | +4 |
| 27 | 1 | 0 |
| 28 | 1 | 0 |
| 29 | 1 | 0 |
| 30 | 1 | 0 |
| 31 | 1 | 0 |
| 32 | 1 | 0 |
| 33 | 1 | 0 |
| 34 | 1 | 0 |
| 35 | 1 | 0 |
| 36 | 1 | 0 |
| 37 | 1 | −4 |
| 38 | 1 | −8 |
| 39 | 1 | −4 |
| 40 | 1 | 0 |
| 41 | 1 | 0 |
| ↓ | ↓ | ↓ |
| 360 | 1 | 0 |

Exemplary data obtained from the first 41 samples of sensor 118a are shown in Table 4. Similar data is obtained and stored for sensor 118b, but has not been shown.

Referring again to FIG. 7A, after the readings from sensors 118a and 118b have been entered in memory Table DBUF, the program enters step S23 which sets a line index for the stored measurement table (MESPC) equal to 1. This enables the program to access the data shown in line 1 of Table 2 as indicated by step S24. The program proceeds to step S26 in which a variable SENSOR is set equal to the sensor identified at line 1 in Table 2 (i.e, sensor 1 corresponding to sensor 118a). Since the analysis type in line 1 of Table 2 equals type 1, the program calls an analysis routine PEAK which performs a peak to peak analysis (steps S27, S28).

Referring to FIG. 7C, the peak-to-peak analysis algorithm (PEAK), is entered at step S38. In step S39, the variable SAMPLE is set equal to 1. In step S40, a variable LOWPK is set equal to the value, IVAL (1, SENSOR), of the input data shown in Table 4 for sample (degree) 1 and sensor 1 (i.e., 0). In step S41, another variable HIGHPK is set equal to the same value. In step S42, SAMPLE is set equal to 2.

In step S43, the value of IVAL at SAMPLE 2 and sensor 1 is compared to the value of HIGHPK. If IVAL is greater than HIGHPK, HIGHPK is set equal to IVAL at SAMPLE 2 and sensor 1 in step S44.

In step S45, the current value of IVAL is compared to the value of LOWPK. If IVAL is less than LOWPK, the current value of IVAL replaces the value of LOWPK in step S46.

Since the value of SAMPLE equals 2, the SAMPLE is indexed by 1 in steps S47 and S48, and the routine returns to step S43. Steps S43–S47 are repeated for each value of SAMPLE to 360. At this point in time, HIGHPK equals the largest positive value of the samples (i.e., in this example, +20), and LOWPK equals the smallest value of the samples (i.e., in this case −8). In step S49, the variable VALUE is set equal to the absolute difference between HIGHPK and LOWPK. As a result, VALUE equals the peak-to-peak value of the data from sensor 1. In the example shown in FIG. 8, this difference is 28 (i.e. +20−(−8)).

Step S50 returns the program to step S72 (FIG. 7A) in which VALUE at the current index is stored in a memory table MBUF in the manner shown in Table 5:

TABLE 5

STORED VALUES (MBUF)

| Line | Value |
|---|---|
| 1 | 28 |
| 2 | 28 |
| 3 | 7.48 |

Referring again to FIG. 7B, in step S73, if the index is less than the MAX value stored in the common data storage table, the value of the variable INDEX is increased by 1 in step S74 and the program returns to step S24 (FIG. 7A). The information from index line 2 in Table 2 is then accessed in steps S24 and S25, and the sensor value is changed to 2 in step S26. Since line 2 of Table 2 indicates a type 1 measurement algorithm, the PEAK routine is again called in step S28. The PEAK routine shown in FIG. 7C is then repeated for the sensor 2 values (not shown) which are stored in a manner similar to Table 4 in memory. At the end of the PEAK routine, the value for the line 2 index is stored in the MBUF table as shown in Table 5. Assuming that the data from sensor 2 is the same as the data for sensor 1, the value stored in Table 5 would again be 28. In general however, the value for sensor 2 can be expected to be different from the value for sensor 1.

In steps S73 and S74 (FIG. 7B), the value of INDEX is again increased by 1 to the value 3. The program then loops back to steps S24 and S25 in which the information from line 3 of table 2 is accessed. In step S26, the value of sensor is changed to 1 in accordance with line 3 of Table 2. In steps S27, S70 and S71, the BULG algorithm is called since a type 2 analysis is indicated in line 3 of Table 2.

Referring to FIG. 7D, the BULG routine begins at Step S120.

Figure 8:
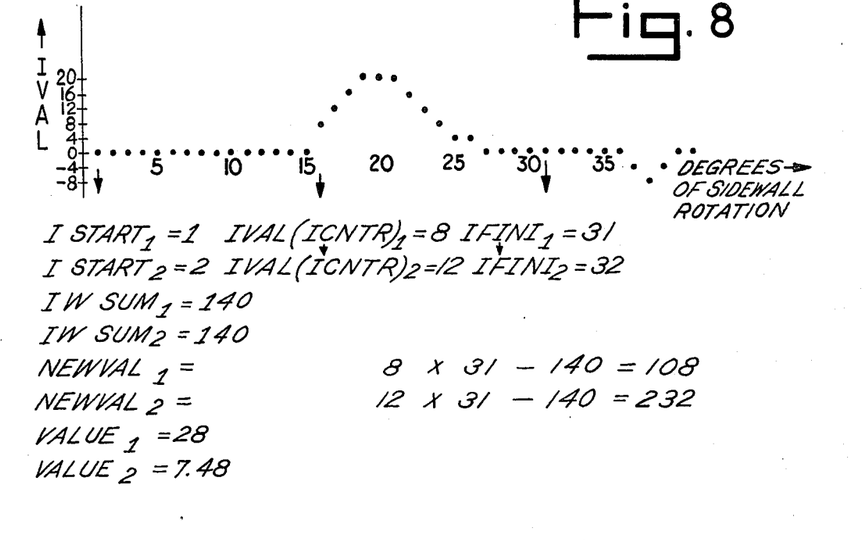
FIG. 8 is a timing diagram illustrating how some of the steps in the flow diagrams of FIGS. 7C and 7D operate on exemplary groups of input data.

In step S121, the program establishes an initial reference base by summing values of IVAL stored in memory for sidewall W1 from the value 1 through the value of a variable IWIDE. IWIDE preferably equals 31, and this is the value entered in line 1 of Table 1. Assuming IWIDE equals 31, the first 31 lateral runout sample values stored in Table 4 (IVAL) are summed by the computer and stored as variable IWSUM. As shown in FIG. 8, IWSUM for the first 31 degrees of rotation equals 140.

In step S122, other initial values used in connection with the first group of lateral runout values are established. That is, computer variables ISTRT, ICENTR and IFINI are established. As shown in FIG. 8, these values for the first group of 31 lateral runout values equal 1, 16 and 13, respectively.

In step S123, program variable VALUE, corresponding to the initial sidewall bulge deformation, is set equal to 0, and SAMPLE again is set equal to 1. Reference values for 360 different groups of lateral runout values are ultimately calculated, and SAMPLE is established as a software counter to keep track of how many groups have been calculated. The counter is initially set equal to 1.

In step S124, the reference value IWSUM is compared to the lateral runout value at degree 16 (i.e., value ICNTR) multiplied times IWIDE. The result is a group deformation value (NEWVAL) indicative of the degree of deformation corresponding to the lateral runout values represented by the first 31 degrees of rotation. As shown in FIG. 8, the first NEWVAL value (NEWVAL$_1$) is 108.

NEWVAL is then compared with the initial VALUE in order to determine whether a new bulge value should be stored. According to step S125, a new bulge value is indicated if the current value of NEWVAL exceeds the current value of VALUE. If so, the new value is stored as a new VALUE in step S126. Since 108 (NEWVAL$_1$) is greater than 0 (VALUE), the value of VALUE is changed to 108.

In step S127, the program determines whether the variable SAMPLE equals 360. Since only one group of lateral runout values has been considered at this point in time, the answer is no, and the program moves on to step S128.

Steps S128-S132 are used to calculate a new group value corresponding to the lateral runout values representing degrees 2-32 of sidewall rotation. In other words, while the initial group corresponded to degrees 1-31 of rotation, the next group under consideration corresponds to degrees 2-32. This portion of the program can be analogized to a 31 degree-wide window which is placed over the tire in order to analyze lateral runout values which show through the window. The window is then rotated 1 degree so that one of the former values is covered up and a new value is exposed. By subtracting the covered up value and adding the newly exposed value, the sum of the values for the new group can be quickly determined without performing the complete summation required in step S121. In accordance with this approach, in step S128, the first point of the old reference group (i.e., IVAL corresponding to rotation sample 1) is stored so that it can be later subtracted from the total group value.

In step S131, pointers for the same values calculated in step S122 are indexed by 1 by means of a modulus operator MOD. This is a standard FORTRAN function which subtracts 360 before indexing in the event the variable exceeds 360. This is needed so that the proper values will be calculated when the window wraps around the entire circumference of the tire and uses some of the initial starting values in the group corresponding to degrees 1-31.

In step S132, a new reference value is calculated by subtracting the old "covered up" value (IOVAL) and adding the "newly exposed" value (i.e., IVAL at degree 32) and storing the resulting value as variable IWSUM. As shown in FIG. 8, IWSUM$_2$ for the second group (degrees 2-32) is still 34. After the new reference value for the new group of lateral runout values has been calculated in step S132, the program indexes variable SAMPLE in step S133. The program then returns to step S124 in order to calculate a new group value (NEWVAL) for the second group. NEWVAL for the second group (NEWVAL$_2$) is calculated to be 232 (see FIG. 8). Since NEWVAL$_2$ is greater than the previous value for VALUE (i.e. 108), 232 is stored as the new value for VALUE in step S126. The program then proceeds through steps S127-S133 as previously described.

After 360 groups of values have been considered, the variable SAMPLE equals 360, and the program branches to step S129. In step S129, VALUE is scaled by dividing by 31 (the value of IWIDE) in order to prepare the value for proper comparison with the bulge limit established in Table 3. Assuming VALUE at the beginning of step S129 was 232, VALUE at step S130 would be 232/31 or 7.48. In step S130, the program returns to step S72 (FIG. 7B).

In step S72, the scaled VALUE value is stored in line 3 of Table 7 for later comparison to a limit.

Since both INDEX and MAX both equal 3, in step S73, the program is directed on to step S150 (FIG. 7B). As shown in FIG. 7B, the program compares the values previously stored in Table 5 to the limits stored in Table 3. In step S150, the line index is set equal to 1, and in step S151, the limit stored at line 1 of Table 3 (i.e., 35) is obtained. Since 35 is less than the value stored in line 1 of Table 5 (i.e., 28), the index value is increased by 1 in steps S153 and S154, and the program loops back to S151. The program then determines whether the value stored at line 2 of Table 5 is greater than the limit stored at line 2 of Table 3. Since it is not, the line index is again increased by 1 in steps S153 and S154 and the values and limit stored in line 3 of Table 3 and 5 are compared. After line 3 is compared, INDEX equals MAX, and the program generates an output flag in step S155 to indicate that the routine has been completed. The program then loops back to step S20 (FIG. 7A) and waits for another tire to be tested.

In the event that the value stored in Table 5 exceeds the limit stored in Table 3, an output reject flag would be set in step S156 (FIG. 7B). In response to the setting of the REJECT flag in step S156, the marking apparatus shown in FIG. 9 can be initiated through buss 192 in order to mark the tire with indicia indicating the presence of an unacceptable bulge or peak-to-peak value. Similarly, a logical one signal can be transmitted over conductor 182 in order to raise conveyor gate 168 to a position adjacent conveyor 164 in order to segregate an unacceptable tire from an acceptable one.

Although the best mode of the invention known to the applicant has been described herein, those skilled in the art will recognize that the best mode may be altered and modified without departing from the true spirit and scope of the invention as defined in the accompanying claims.

What is claimed is:

1. In a tire manufacturing system including means for assembling and curing components of the tire and for testing the cured tire by detecting tire data from at least a first sensor means and a second sensor means and analyzing the data by at least a first testing algorithm and a second testing algorithm, improved apparatus for enabling an operator to select combinations of said sensor means and said testing algorithms in order to analyze the tire based on the selected combination, said apparatus comprising:
   means for selecting at least one combination of said sensor means and a testing algorithm, each selected combination comprising at least one of said first and second sensor means and at least one of said first and second testing algorithms;
   storage means for storing data obtained from the selected sensor means;
   processing means for analyzing the data according to the selected testing algorithm; and
   means for indicating the condition of the tire in response to the analysis of the data.

2. Apparatus, as claimed in claim 1, wherein tire data is detected by generating an analog signal and wherein the apparatus further comprises means for converting the analog signal to digital signals representing a plurality of tire dimensional values.

3. Apparatus, as claimed in claim 2, wherein the storage means comprises a digital memory.

4. Apparatus, as claimed in claim 1, wherein the means for selecting comprises a keyboard and a display screen.

5. Apparatus, as claimed in claim 1, wherein the means for selecting further enables the entry of at least one limit value defining an acceptable limit of a characteristic of the tire.

6. Apparatus as claimed in claim 5, wherein the processing means comprises means for determining the combination selected by the operator, for processing the selected testing algorithm according to the tire data derived from the selected sensor means in order to obtain a resulting value indicative of the condition of the tire and for comparing said resulting value against said limit value to determine whether the tire is acceptable, and
   wherein the means for indicating comprises means for indicating the condition of the tire based on the comparison of said resulting value against said limit value.

7. Apparatus, as claimed in claims 1 or 6, wherein the means for indicating comprises means for marking the tire.

8. Apparatus, as claimed in claims 1 or 6, wherein the means for indicating comprises means for gating the tire.

9. In a tire manufacturing process including assembling and curing components of the tire and testing the cured tire by detecting tire data from at least a first sensor means and a second sensor means and analyzing the data by at least a first testing algorithm and a second testing algorithm, an improved method for enabling an operator to select combinations of said sensor means and said testing algorithms in order to analyze the tire based on the selected combination, said method comprising the steps of:
   generating signals representative of at least one combination of sensor means and a testing algorithm, each said combination comprising at least one of said first and second sensor means and at least one of said first and second testing algorithms;
   storing data obtained from the represented sensor means;
   analyzing the data according to the represented testing algorithm; and
   indicating the condition of the tire in response to the analysis of the data.

10. A method, as claimed in claim 9, wherein tire data is detected by generating an analog signal and wherein the method further comprises converting the analog signal to digital signals representing a plurality of tire dimensional values.

11. A method, as claimed in claim 9, wherein the step of generating comprises generating a signal representing at least one limit value defining an acceptable limit of a characteristic of the tire.

12. A method, as claimed in claim 11, wherein the step of analyzing comprises the steps of:
   processing the represented testing algorithm according to the tire data derived from the represented sensor means in order to obtain a resulting value indicative of the condition of the tire, and
   comparing said resulting value against said limit value to determine whether the tire is acceptable, and
   wherein the step of indicating comprises the step of indicating the condition of the tire based on the comparison of said resulting value against said limit value.

13. A method, as claimed in claims 9 or 12, wherein the step of indicating comprises marking the tire.

14. A method, as claimed in claims 9, or 12, wherein the step of indicating comprises gating the tire.

* * * * *